No. 684,012. Patented Oct. 8, 1901.
G. W. WALKER.
BANANA SHIPPING CRATE.
(Application filed Mar. 21, 1901.)

(No Model.)

Witnesses
A. J. Colbourne
J. W. Loeblei

Inventor
George W. Walker
by Ridout & Maybee
Atty's

THE NORRIS PETERS CO., PHOTO-LITHO., WASHINGTON, D. C.

UNITED STATES PATENT OFFICE.

GEORGE WARREN WALKER, OF GUELPH, CANADA.

BANANA-SHIPPING CRATE.

SPECIFICATION forming part of Letters Patent No. 684,012, dated October 8, 1901.

Application filed March 21, 1901. Serial No. 52,237. (No model.)

*To all whom it may concern:*

Be it known that I, GEORGE WARREN WALKER, of the city of Guelph, in the county of Wellington, Province of Ontario, Canada, have invented certain new and useful Improvements in Banana-Shipping Crates, of which the following is a specification.

The object of my invention is to devise a simple shipping-case for shipping ripe bananas without injury; and it consists, essentially, of a crate formed in halves, each half being provided with a canvas flap secured to one edge to retain in position a quantity of packing material placed between the sides of the crate and the canvas, substantially as hereinafter more specifically described and then definitely claimed.

Figures 1, 2:
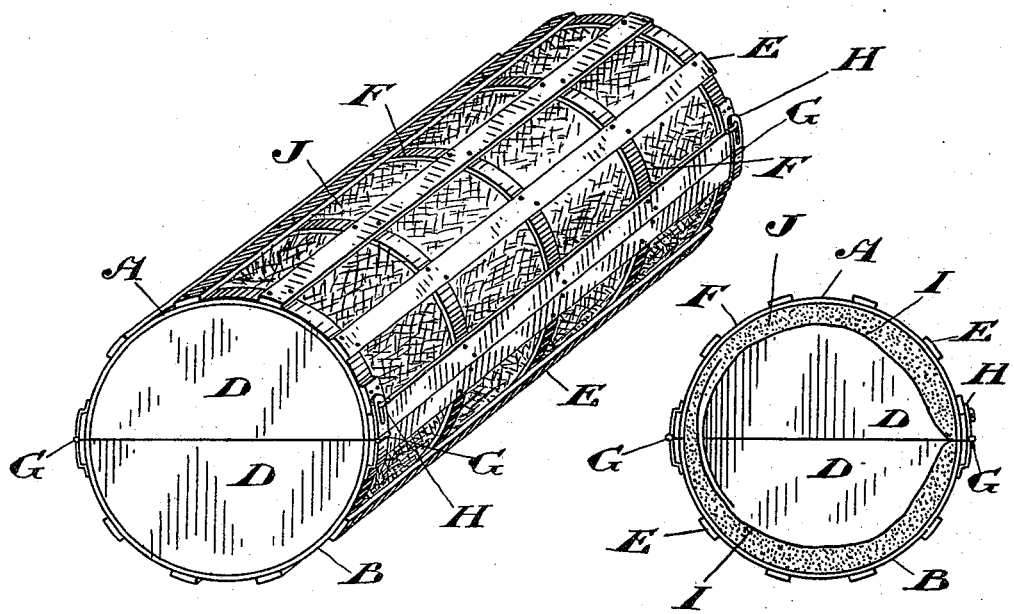
Figure 3:
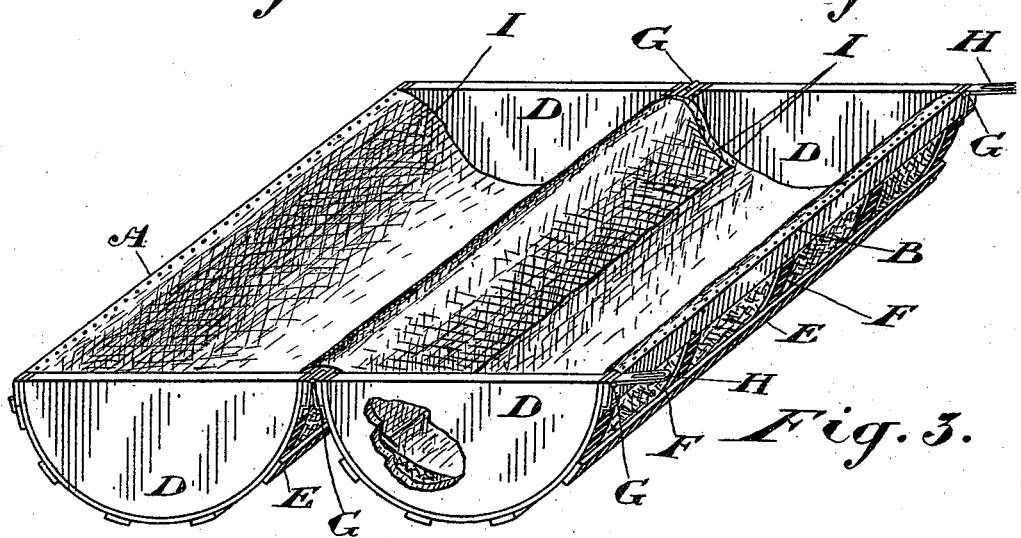

Figure 1 is a perspective view of my improved crate closed. Fig. 2 is a cross-section of the same empty, but with the canvas and packing-grass distended as though the crate were full. Fig. 3 is a perspective view of the crate opened out ready to receive a bunch of bananas.

In the drawings like letters of reference indicate corresponding parts in the different figures.

The crate is formed in two halves A B. Each half consists of two semicircular end pieces D, connected together by longitudinal strips E. These strips are stayed and strengthened between the ends by means of the semicircular hoops F, secured thereto.

The two halves of the crate are connected by the hinges G, so that the crate may be closed, as seen in Fig. 1, or opened out, as in Fig. 3. When closed, the halves are locked together by means of the hasps H, which are of common construction.

Connected to the free sides of the halves of the crate are strips of canvas I. These canvas strips extend from end to end of the crate and are of sufficient width to overlap, as shown.

When a bunch of fruit is to be packed, a quantity of packing-grass J is properly distributed in each half of the crate, which is readily done by raising the canvas strips. These strips are then folded over the top of the grass, as shown in Fig. 3, and the bunch of fruit placed in position. The crate is then closed and locked, as indicated in Figs. 1 and 2.

In a crate such as described a bunch of bananas may be shipped by the wholesaler to a retailer without the least fear of injury to the fruit. It is also kept cool and dry, owing to the fibrous and textile material by which it is surrounded.

Many changes might be made from the exact construction shown without departing from the spirit of my invention, the nature of which is more particularly set out in the accompanying claims.

What I claim as my invention is—

1. A shipping-crate formed of two halves with a canvas flap secured to each half, each of said flaps having one edge fastened to its respective half of the crate and its other end free and of a length to extend over the other half, whereby the free ends may be raised and a suitable amount of packing placed under said flaps, substantially as described.

2. A shipping-crate formed of two halves hinged together and provided with suitable fastening devices, each half being composed of a semicircular end, and a canvas flap secured to each half, each of said flaps having one edge fastened to its respective half of the crate and its other end free and of a length to extend over into the other half, whereby the free ends may be raised and a suitable amount of packing placed under said flaps, substantially as described.

3. A shipping-crate formed of two halves, each half composed of semicircular ends, spaced strips connecting the ends, half-hoops connecting the strips, canvas flaps, each having one edge secured to its respective half, and its other end free, and soft packing material located between the sides of the case and the canvas flaps, substantially as described.

4. A shipping-crate formed of two halves with a canvas flap secured to each half, each of said flaps having one edge fastened to its respective half of the crate and its other end free, the said free ends overlapping, whereby the free ends may be raised and a suitable amount of packing placed under said flaps, substantially as described.

5. A shipping-crate formed of two halves, each half composed of semicircular ends, spaced strips connecting the ends, half-hoops connecting the strips, in combination with canvas flaps, each having one edge connected to the hasp edge of its respective half, and its free ends overlapping, and soft packing material located between the sides of the case and the canvas, substantially as described.

Guelph, March 16, 1901.

GEORGE WARREN WALKER.

In presence of—
C. F. DUNBAR,
HUGH MCMULLON.